United States Patent
Takai et al.

(10) Patent No.: US 10,819,070 B2
(45) Date of Patent: Oct. 27, 2020

(54) ANTI-THEFT BRACKET

(71) Applicant: HONDA MOTOR CO., LTD., Tokyo (JP)

(72) Inventors: Keisuke Takai, Wako (JP); Shinji Kamiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/578,699

(22) Filed: Sep. 23, 2019

(65) Prior Publication Data

US 2020/0094756 A1 Mar. 26, 2020

(30) Foreign Application Priority Data

Sep. 26, 2018 (JP) .................................. 2018-180415

(51) Int. Cl.
*H01R 13/639* (2006.01)
*B60R 16/02* (2006.01)
*B60R 25/00* (2013.01)

(52) U.S. Cl.
CPC ..... *H01R 13/6397* (2013.01); *B60R 16/0215* (2013.01); *B60R 25/00* (2013.01)

(58) Field of Classification Search
CPC ............................................... H01R 13/6397
See application file for complete search history.

(56) References Cited

U.S. PATENT DOCUMENTS

| 4,059,335 | A | * | 11/1977 | Simon | .................... | H01R 4/301 439/813 |
| 5,000,218 | A | | 3/1991 | Hayasaki et al. | | |
| 5,506,563 | A | * | 4/1996 | Jonic | ...................... | B60R 25/04 180/287 |
| 7,097,474 | B1 | * | 8/2006 | Naylor | ............... | H01R 13/6397 174/67 |
| 2009/0294198 | A1 | * | 12/2009 | Ahmed | ................... | B60R 25/00 180/287 |
| 2010/0186531 | A1 | | 7/2010 | Miyagawa et al. | | |
| 2010/0196119 | A1 | | 8/2010 | Miyagawa et al. | | |
| 2012/0236473 | A1 | * | 9/2012 | Sun | .................... | H01R 13/6397 361/679.01 |
| 2014/0127939 | A1 | * | 5/2014 | Ishibashi | .............. | H01R 13/748 439/573 |

(Continued)

FOREIGN PATENT DOCUMENTS

| JP | H02-5642 U | 1/1990 |
| JP | H07-220806 A | 8/1995 |

(Continued)

OTHER PUBLICATIONS

Japanese Office Action received in corresponding JP application No. 2018-180415 dated Jan. 14, 2020 with English translation, 9 pages.

(Continued)

*Primary Examiner* — James Harvey
(74) *Attorney, Agent, or Firm* — Rankin, Hill & Clark LLP (57) ABSTRACT

An anti-theft bracket according to the present invention is an anti-theft bracket provided near a parking driver. The parking driver is connected to a parking actuator via a harness with a connector of the harness inserted in the parking driver. The anti-theft bracket includes a connector detachment restricting part covering the connector.

9 Claims, 10 Drawing Sheets

(56) References Cited

U.S. PATENT DOCUMENTS

| | | | | |
|---|---|---|---|---|
| 2014/0290975 A1* | 10/2014 | Isaacks | ................ | H02G 3/086 |
| | | | | 174/50.52 |
| 2018/0309240 A1* | 10/2018 | Cunningham | ..... | H01R 13/6397 |
| 2019/0052018 A1* | 2/2019 | Cyzen | ................ | H01R 13/6395 |
| 2020/0094756 A1* | 3/2020 | Takai | ................ | H01R 13/6397 |
| 2020/0127415 A1* | 4/2020 | Woo | .................... | H01R 13/631 |

FOREIGN PATENT DOCUMENTS

| | | |
|---|---|---|
| JP | 2008-074304 A | 4/2008 |
| JP | 2009-092134 A | 4/2009 |
| JP | 1424431 B2 | 3/2010 |
| JP | 2010-158980 A | 7/2010 |
| JP | 2010-169208 A | 8/2010 |

OTHER PUBLICATIONS

Office Action received in corresponding Japanese application No. 2018-180415 dated Jul. 7, 2020 with English translation(10 pages).

\* cited by examiner

ANTI-THEFT BRACKET

BACKGROUND OF THE INVENTION

1. Field of the Invention

The present invention relates to an anti-theft bracket.

2. Description of the Related Art

A vehicle is equipped with a body control module (hereinafter referred to as a "BCM") which sends a signal to each driver while monitoring switches and the like. For example, when a shift range "P" is selected, the BCM sends a signal to a parking driver. Upon receipt of the signal, the parking driver drives a parking actuator to activate a parking mechanism.

In addition, the parking actuator is fixed with bolts. Patent Literature 1 has proposed covers and caps which cover the bolts. The covers and caps make it difficult to detach the parking actuator. Specifically, the covers and caps increase the amount of time it takes to detach the parking actuator and undo the parking mechanism, and makes the vehicle less likely to be stolen.

PRIOR ART DOCUMENT(S)

Patent Literature(s)

Patent literature 1: JP4424431B

SUMMARY OF THE INVENTION

Meanwhile, the parking driver and the parking actuator are connected to each other via a harness. This involves a risk that a connector of the harness is detached from the parking driver and is connected to a different parking driver. In other words, there is likelihood that: the parking actuator is connected to a different BCM and a different parking driver; and thus, the parking actuator is driven by the different BCM and the different parking driver, and undoes the parking mechanism (the vehicle is stolen).

The present invention has been made with the foregoing background taken into consideration. An object thereof is to provide an anti-theft bracket which makes it difficult to detach a connector of a harness, and which can accordingly enhance the anti-theft capability.

As a solution to the problem, the anti-theft bracket according to the present invention is an anti-theft bracket provided near a parking driver. The parking driver is connected to a parking actuator via a harness with a connector of the harness inserted in the parking driver. The anti-theft bracket includes a connector detachment restricting part covering the connector.

The present invention increases the amount of time it takes to detach the connector, and enhances the anti-theft capability.

DETAILED DESCRIPTION OF THE EMBODIMENTS

Descriptions will be provided for vehicles 100, 101, 102 including anti-theft brackets according to embodiments, respectively. Technical components common to the embodiments will be denoted by the same reference signs. In addition, an inner side in a vehicle width direction will be hereinafter referred to as a "vehicle inner side," while an outer side in the vehicle width direction will be hereinafter referred to as a "vehicle outer side."

First Embodiment

Figure 1:
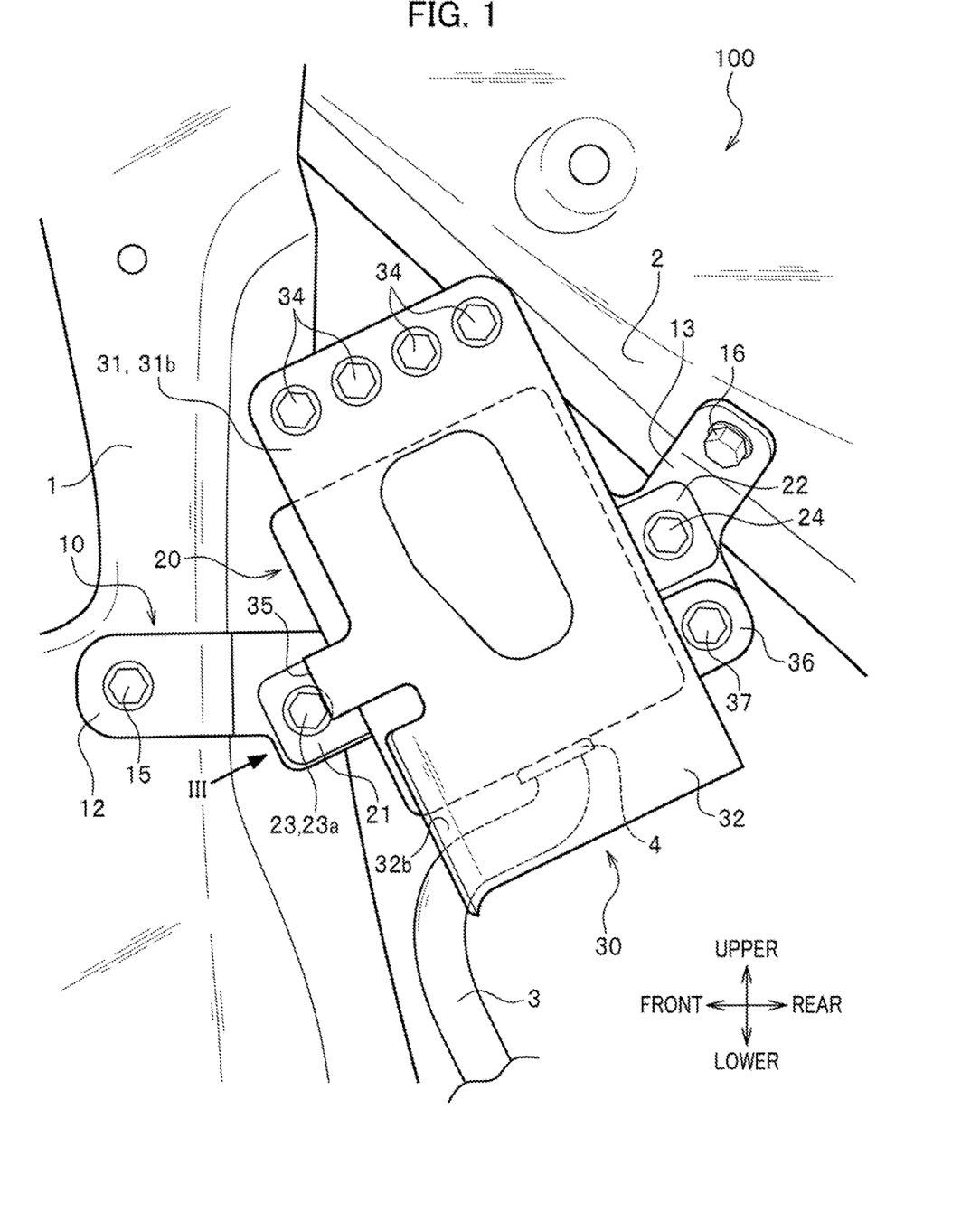
FIG. 1 is a left side view of an anti-theft bracket and its vicinity in a first embodiment from inside a vehicle (from its left side)

As shown in FIG. 1, a vehicle 100 includes: a first frame 1 extending in an upper-lower direction; a second frame 2 extending from the first frame 1 while inclining rearward and downward; a harness 3; a base bracket 10 extending over between the first frame 1 and the second frame 2; a parking driver 20 fixed to a vehicle inner side of the base bracket 10; and an anti-theft bracket 30 covering a vehicle inner side of the parking driver 20.

The first frame 1 and the second frame 2 are skeletal parts arranged at aright side of a trunk room (not shown) in a rear section of the vehicle 100. A lining (not shown) serving as a right wall of the trunk room is put on vehicle inner sides of the respective first and second frames 1, 2. The lining covers the base bracket 10, the parking driver 20 and the anti-theft bracket 30 from the vehicle inner side.

Meanwhile, since the parking driver 20 is exposed to the trunk room (the vehicle inner side) when the lining (not shown) is detached, there is likelihood that working for stealing the parking driver 20 is carried out from the trunk room (the vehicle inner side).

The base bracket 10 is a plate-shaped part for fixing the parking driver 20 to a vehicle body (the first frame 1 and the second frame 2).

Figure 2:
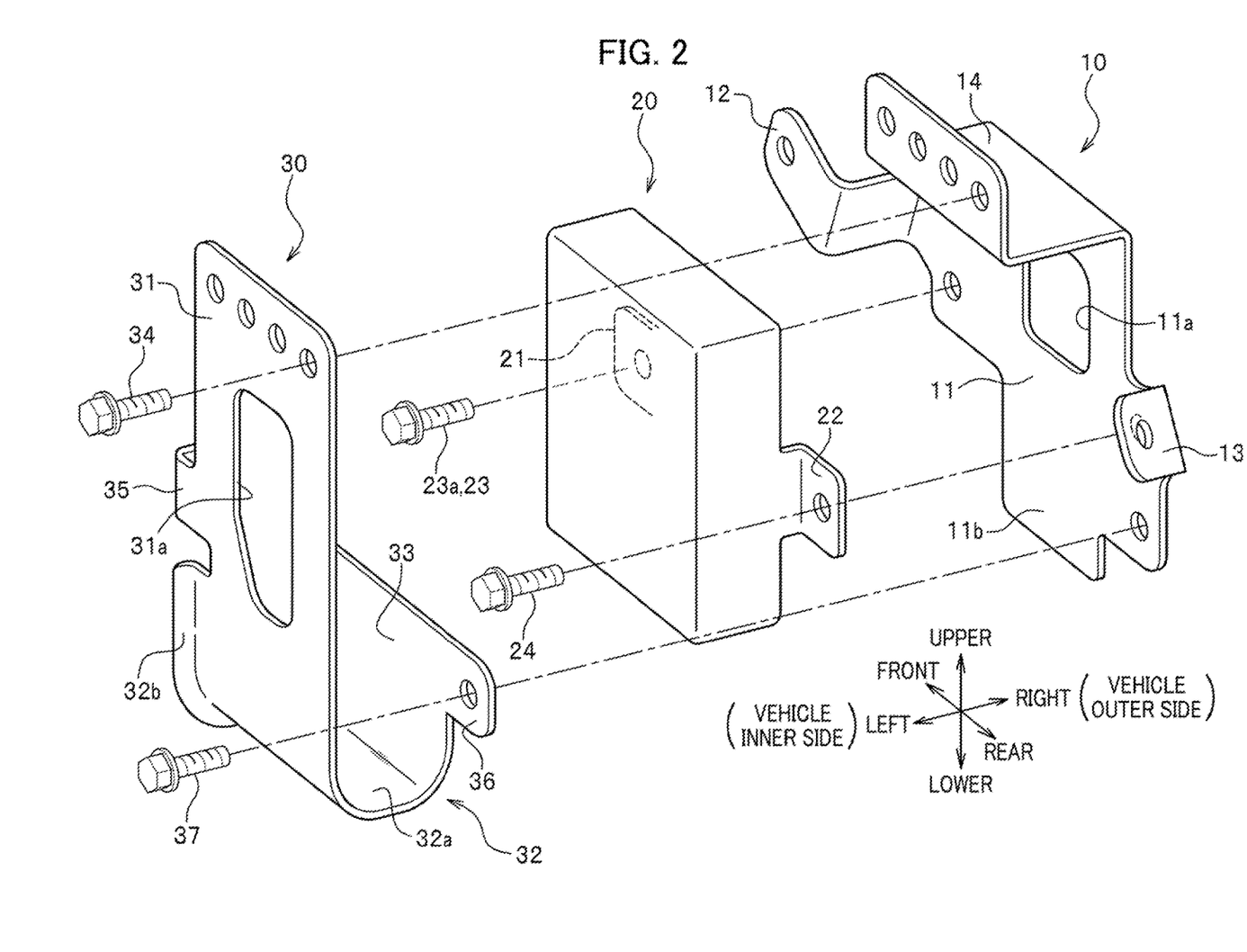
FIG. 2 is a perspective view of a base bracket, a parking driver and the anti-theft bracket in the first embodiment which are slightly separated from one another by distance.

As shown in FIG. 2, the base bracket 10 includes: a plate-shaped main body part 11 extending in the front-rear and upper-lower directions; a front flange 12 extending frontward from a front end of the main body part 11; a rear flange 13 extending rearward from a rear end of the main body part 11; and an upper flange 14 extending leftward (toward the vehicle inner side) from an upper end of the main body part 11.

The main body part 11 is formed in substantially the same size as the parking driver 20 in their side view, and is provided with a weight-reduction hole 11a in its central portion. The main body part 11 is arranged between the first frame 1 and the second frame 2.

As shown in FIG. 1, the front flange 12 is superposed on the vehicle inner side of the first frame 1, and is fastened to the first frame 1 with a base fastener 15. In addition, the rear flange 13 is superposed on the vehicle inner side of the second frame 2, and is fastened to the second frame 2 with a base fastener 16.

Figure 3:
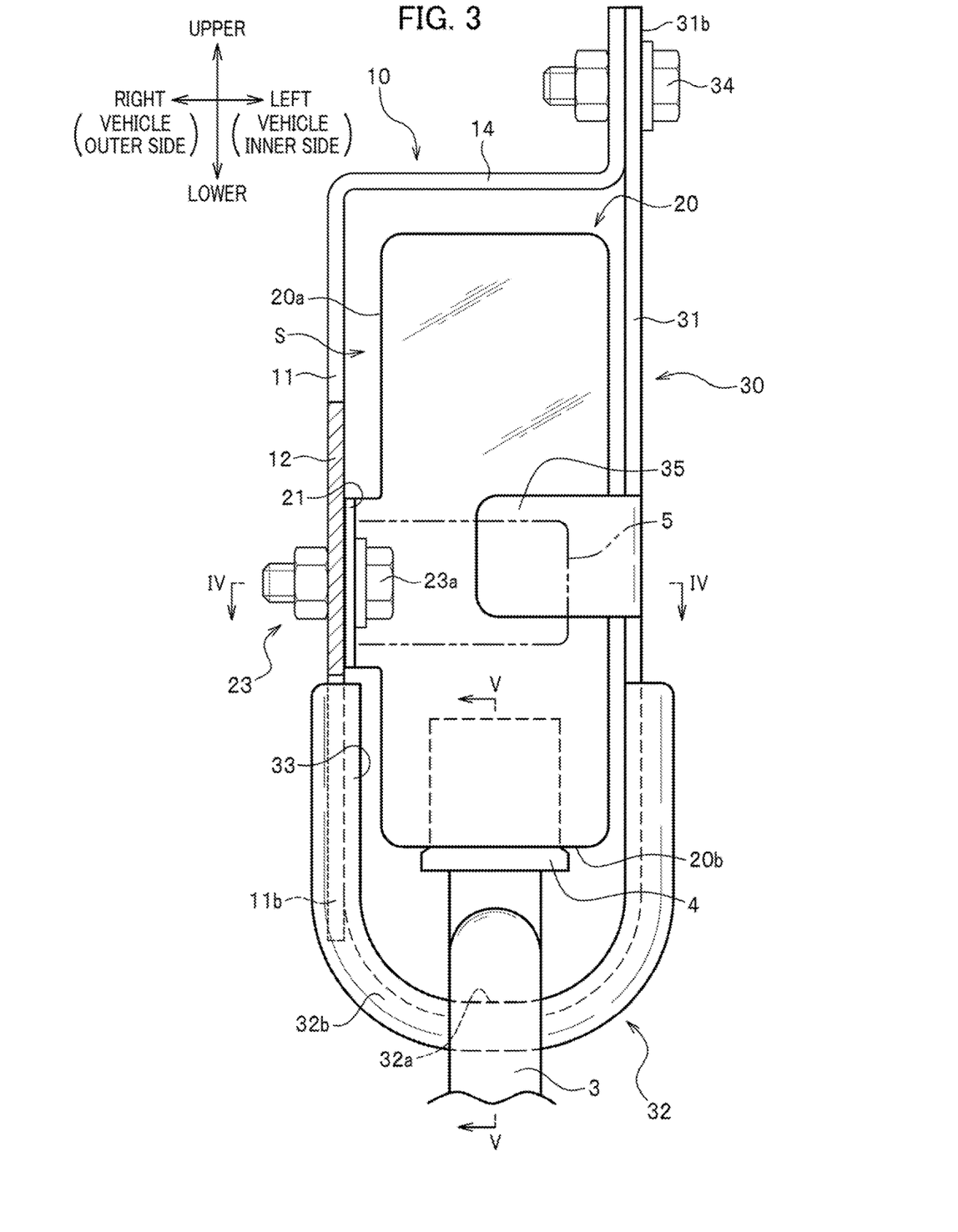
FIG. 3 is a view of the base bracket, the parking driver and the anti-theft bracket in a direction pointed by an arrow III line in FIG. 1.

As shown in FIG. 3, an inner wall part 31 (discussed later) of the anti-theft bracket 30 is fixed to the upper flange 14. The upper flange 14 extends leftward (toward the vehicle inner side) from the upper end of the main body part 11, and extends upward from an end portion of the leftward-extending portion. In its cross-sectional view, the upper flange 14 is shaped substantially like the letter L. Furthermore, the upper flange 14 covers an upper surface of the parking driver 20, and is close to the upper surface of the parking driver 20. Moreover, a lower end 11b of the main body part 11 extends downward beyond a lower surface 20b of the parking driver 20.

The parking driver 20 is an apparatus which receives signals from the BCM (not shown) and controls the drive of a parking actuator (not shown). The parking driver 20 is wirelessly connected to the BCM, and is connected to the parking actuator (not shown) via the harness 3.

As shown in FIG. 2, an external form of the parking driver 20 is shaped like a right-angled parallelepiped.

The parking driver 20 includes a first flange 21 formed therein to extend forward, and a second flange 22 formed therein to extend rearward.

As shown in FIG. 1, the parking driver 20 is arranged between the first frame 1 and the second frame 2, as well as at the vehicle inner side of the main body part 11 of the base bracket 10.

The first flange 21 is superposed on a vehicle inner side of a base portion of the front flange 12 of the base bracket 10, and is fastened to the front flange 12 with a first driver fastener 23. The second flange 22 is superposed on a vehicle inner side of a base portion of the rear flange 13 of the base bracket 10, and is fastened to the rear flange 13 with a second driver fastener 24.

Figure 4:
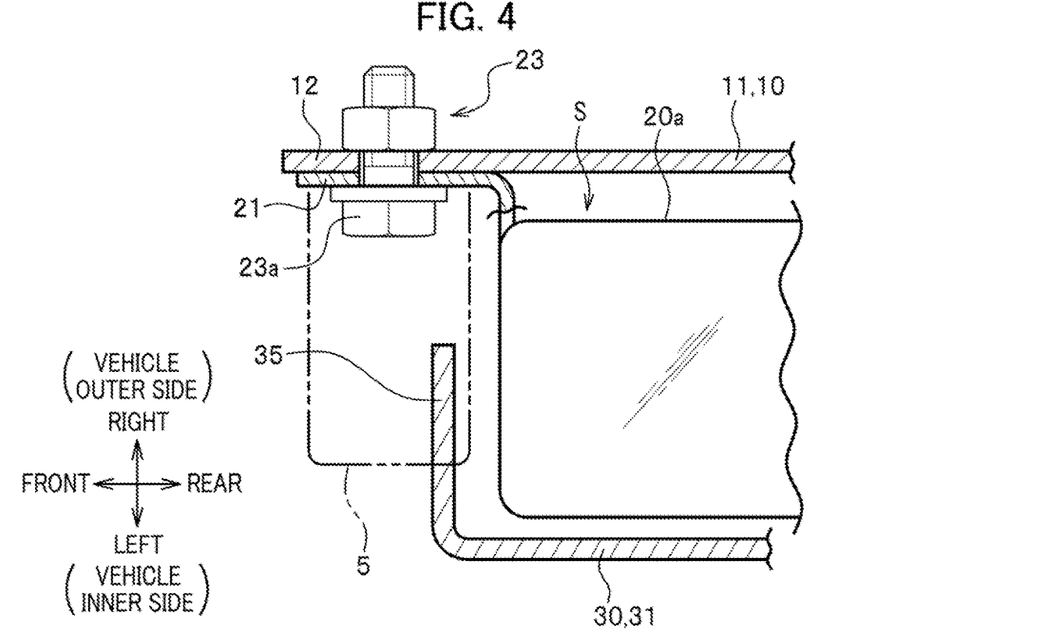
FIG. 4 is a cross-sectional view taken along the IV-IV line and in a direction pointed by the arrow lines IV in FIG. 3.

As shown in FIGS. 3 and 4, the first flange 21 and the second flange 22 (although the second flange 22 is not shown in FIGS. 3 and 4) are formed located further rightward (toward the vehicle outer side) than a right surface 20a (a vehicle outer side surface) of the parking driver 20. Thus, the parking driver 20 is away from the base bracket 10 (the main body part 11) in a vehicle width direction, and a space S is formed between the parking driver 20 and the main body part 11.

Figure 5:
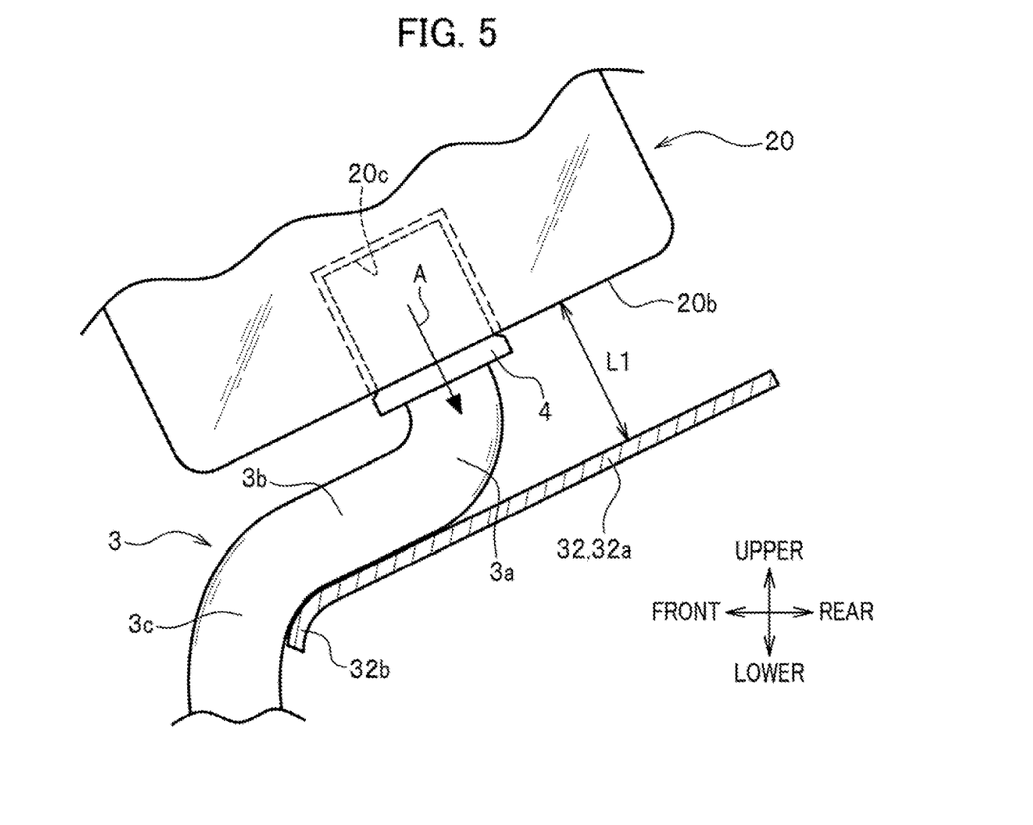
FIG. 5 is an end view taken along the V-V line and in a direction pointed by the arrow lines V in FIG. 3.

As shown in FIG. 5, a female connector 20c is provided to the lower surface 20b of the parking driver 20. A male connector 4 provided to an end of the harness 3 is inserted in the female connector 20c.

The female connector 20c is opened rearward and downward. Thus, when the male connector 4 is moved rearward and downward (see an arrow A in FIG. 5) with a claw part (not shown) of the female connector 20c pinched between the thumb and finger, the male connector 4 comes out of the female connector 20c, and the male connector 4 can be thereby detached from the parking driver 20. The direction indicated with the arrow A will be hereinafter referred to as a "detachment direction."

As shown in FIGS. 2 and 3, the anti-theft bracket 30 is a plate-shaped part whose cross section is shaped substantially like the letter J. The anti-theft bracket 30 includes: the inner wall part 31 covering the vehicle inner side of the parking driver 20; a connector detachment restricting part 32 covering a lower portion of the parking driver 20; and an outer wall part 33 covering a vehicle outer side of the parking driver 20.

As shown in FIG. 2, the inner wall part 31 has a rectangular shape in its side view, and includes a weight-reduction hole 31a formed in its central portion.

As shown in FIGS. 1 and 3, an upper end part 31b of the inner wall part 31 is superposed on a vehicle inner side of the upper flange 14 of the base bracket 10, and the inner wall part 31 is fastened to the upper flange 14 with four first anti-theft fasteners 34.

As shown in FIGS. 1 to 4, a driver detachment restricting part 35 extending bending toward the vehicle outer side is formed in a front end of the inner wall part 31. The driver detachment restricting part 35 has a plate shape which is thin in the front-rear direction. Furthermore, the driver detachment restricting part 35 overlaps a head of a bolt 23a of the first driver fastener 23 in a view from an axial direction of the bolt 23a (from the vehicle inner side) (see FIG. 1).

As shown in FIG. 3, the connector detachment restricting part 32 is shaped like the letter U which is open upward in its view from the front-rear direction, and covers the lower surface 20b of the parking driver 20 and the male connector 4 from under them. A portion (a wall portion located in the detachment direction A) which is located lowest in the connector detachment restricting part 32 and faces the lower surface 20b of the parking driver 20 will be hereinafter referred to as a "bottom wall part 32a."

As shown in FIG. 5, the bottom wall part 32a inclines in a way that locates the bottom wall part 32a higher toward its rear from its front, and is parallel with the lower surface 20b of the parking driver 20. In addition, a distance L1 between the bottom wall part 32a and the lower surface 20b of the parking driver 20 is set short enough to prevent the male connector 4 from coming out of the female connector 20c even if anyone tries to detach the male connector 4 from the female connector 20c. Furthermore, the bottom wall part 32a of the connector detachment restricting part 32 closes a side in the detachment direction A of the male connector 4, and one end part 3a of the harness 3 is bent and contacts the bottom wall part 32a.

A bent part 32b shaped like an arc in its cross-sectional view and bent from an inner surface side (a surface on a side facing the male connector 4) to an outer surface side is formed in a front end of the connector detachment restricting part 32.

As shown in FIG. 3, the bent part 32b is formed not only in the bottom wall part 32a but also throughout the front end of the connector detachment restricting part 32. In addition, the bent part 32b is expansively formed in a lower portion of the inner wall part 31 and the outer wall part 33.

The outer wall part 33 extends further upward than the lower end 11b of the main body part 11 of the base bracket 10, and gets into the interstice (the space S) between the base bracket 10 and the parking driver 20.

As shown in FIG. 2, a projecting piece 36 projecting rightward is formed in a right end of the outer wall part 33. As shown in FIG. 1, the projecting piece 36 is superposed on the vehicle inner side of the base portion of the rear flange 13 of the base bracket 10, and is fastened to the rear flange 13 with a second anti-theft fastener 37.

As shown in FIG. 5, the one end part 3a of the harness 3 is routed over the anti-theft bracket 30 in a way that bends the one end part 3a frontward. In addition, the harness 3 includes: an extending part 3b formed therein to extend frontward along the bottom wall part 32a of the connector detachment restricting part 32; and a bent part 3c formed therein to be bent downward along the bent part 32b.

As discussed above, the anti-theft bracket 30 according to the first embodiment is the anti-theft bracket 30 provided near the parking driver 20. The parking driver 20 is connected to the parking actuator (not shown) via the harness 3 with the male connector 4 (the connector) of the harness 3 inserted in the parking driver 20. The anti-theft bracket 30 includes the connector detachment restricting part 32 covering the male connector 4 (the connector).

The vehicle 100 includes the anti-theft bracket 30, which makes it difficult to insert a tool and the hand toward the male connector 4. Even if the tool and the hand are inserted toward the male connector 4, it is difficult to detach the male connector 4 from the female connector 20c since the detachment is restricted in the way that prevents the male connector 4 from coming out of the female connector 20c. On the other hand, it takes much time to detach the anti-theft bracket 30 and cancel the restriction performed by the connector detachment restricting part 32. From the above reasons, the anti-theft bracket 30 offers a very high capability of protecting the vehicle 100 from theft.

In addition, the connector detachment restricting part 32 according to the first embodiment has a U shape. Specifically, the connector detachment restricting part 32 includes: the bottom wall part 32a which closes the side in the detachment direction A of the male connector 4; the wall part which extends in the detachment direction A of the male connector 4 and thereby closes the vehicle inner side of the male connector 4; and the wall part which extends in the detachment direction A of the male connector 4 and thereby closes the vehicle outer side of the male connector 4 (see FIG. 3).

This configuration makes it impossible to insert a tool or the hand toward the connector detachment restricting part 32 from any side surfaces (on the vehicle inner side or the vehicle outer side) of the male connector 4, or from the lower surface of the male connector 4 (from the detachment direction A). This makes it more difficult to detach the male connector 4 from the parking driver 20, and more enhances the anti-theft capability.

It should be noted that the connector detachment restricting part 32 according to the first embodiment restricts the detachment of the male connector 4 by making the bottom wall part 32a contact the one end part 3a of the harness 3. One may therefore consider the detaching of the parking driver 20 instead of the anti-theft bracket 30 as a method of bringing the harness 3 out of contact with the bottom wall part 32a.

However, the parking driver 20 according to the first embodiment is fixed to the vehicle body with the first driver fastener 23 and the second driver fastener 24 (the fasteners), while the anti-theft bracket 30 includes the driver detachment restricting part 35 covering at least part of the head (the fastener) of the bolt 23a of the first driver fastener 23 (the fastener) in the view from the axial direction of the bolt 23a.

Even if anyone tries to fit a socket 5 of a wrench (not shown) over the head of the bolt 23a from the vehicle inner side for the purpose of detaching the first driver fastener 23 with the wrench, the foregoing configuration forces the socket 5 to come into contact with the driver detachment restricting part 35 and does not allow the socket 5 to be fitted over the head of the bolt 23a. In other words, the parking driver 20 can be detached only after the anti-theft bracket 30 is detached. The above-mentioned method, therefore, cannot detach the male connector 4.

In addition, the base bracket 10 according to the first embodiment includes the upper flange (the flange part) 14 adjacent to the upper portion of the parking driver 20, while the upper flange (the flange part) 14 is arranged at the side opposite to the connector detachment restricting part 32 with the parking driver 20 interposed in between (see FIG. 3).

Even if only the second driver fastener 24 is detached, the foregoing configuration does not allow the parking driver 20 to move upward (turn) around the bolt 23a serving as the turn axis. This prevents the harness 3 from being brought out of contact with the bottom wall part 32a, and accordingly makes the male connector 4 unlikely to be detached.

It should be noted that the present invention may form the upper flange (the flange part) 14 for restricting the turn of the parking driver 20 in the parking driver 20 instead of in the base bracket 10.

Furthermore, in the first embodiment, the harness 3 is routed to extend along the connector detachment restricting part 32, while the bent part 32b bent along the bent part 3c (the routing path) of the harness 3 is formed in the front end portion (the end portion) of the connector detachment restricting part 32. This makes the bent part 3c of the harness 3 less likely to be damaged, and enhances the durability of the harness 3.

Although the first embodiment makes the bottom wall part 32a of the anti-theft bracket 30 cover all the lower surface 20b of the parking driver 20, the present invention may employ a configuration in which the bottom wall part 32a covers only part of the lower surface 20b of the parking driver 20.

In addition, although the first embodiment makes the bottom wall part 32a of the anti-theft bracket 30 close the side in the detachment direction A of the male connector 4 to prevent the male connector 4 from coming out of the female connector 20c, the present invention may make the bottom wall part 32a restrict the movement of the harness 3 to prevent the male connector 4 from coming out of the female connector 20c.

Furthermore, although the connector detachment restricting part 32 according to the first embodiment has a U shape in the view from the front-rear direction, the present invention may form the connector detachment restricting part 32 in an angular U shape in the view from the front-rear direction.

Second Embodiment

Figure 6:
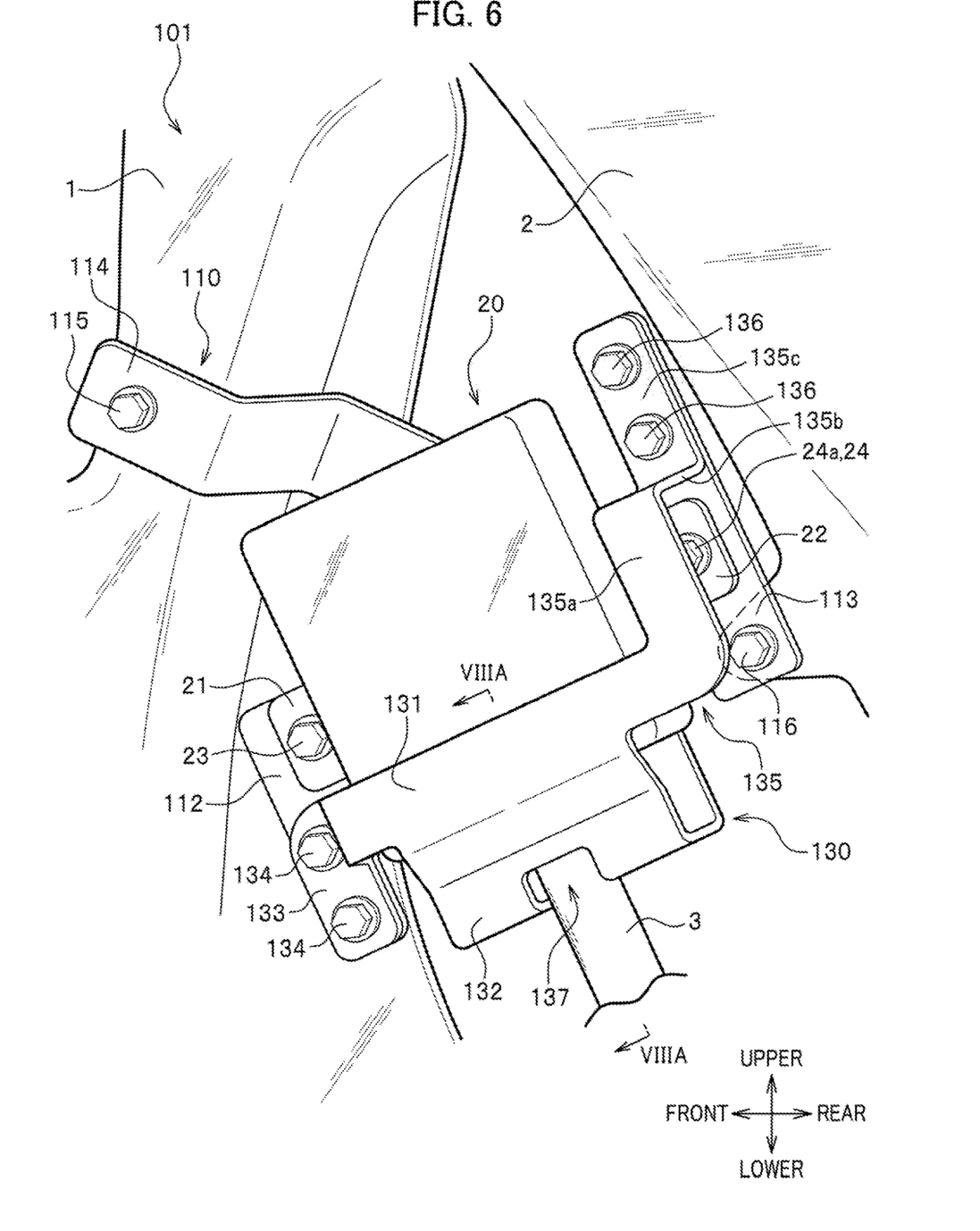
FIG. 6 is a perspective view of an anti-theft bracket and its vicinity in a second embodiment from inside the vehicle (from its left side)

As shown in FIG. 6, a vehicle 101 includes: the first frame 1 extending in the upper-lower direction; the second frame 2 extending rearward and downward from the first frame 1;

the harness 3; a base bracket 110 extending over between the first frame 1 and the second frame 2; the parking driver 20 fixed to a vehicle inner side of the base bracket 110; and an anti-theft bracket 130 covering the lower portion of the parking driver 20.

What makes the vehicle 101 according to the second embodiment different from the vehicle 100 according to the first embodiment is that the vehicle 101 includes the base bracket 110 instead of the base bracket 10, and the anti-theft bracket 130 instead of the anti-theft bracket 30. Only differences from the first embodiment will be hereinafter described.

Figure 7:
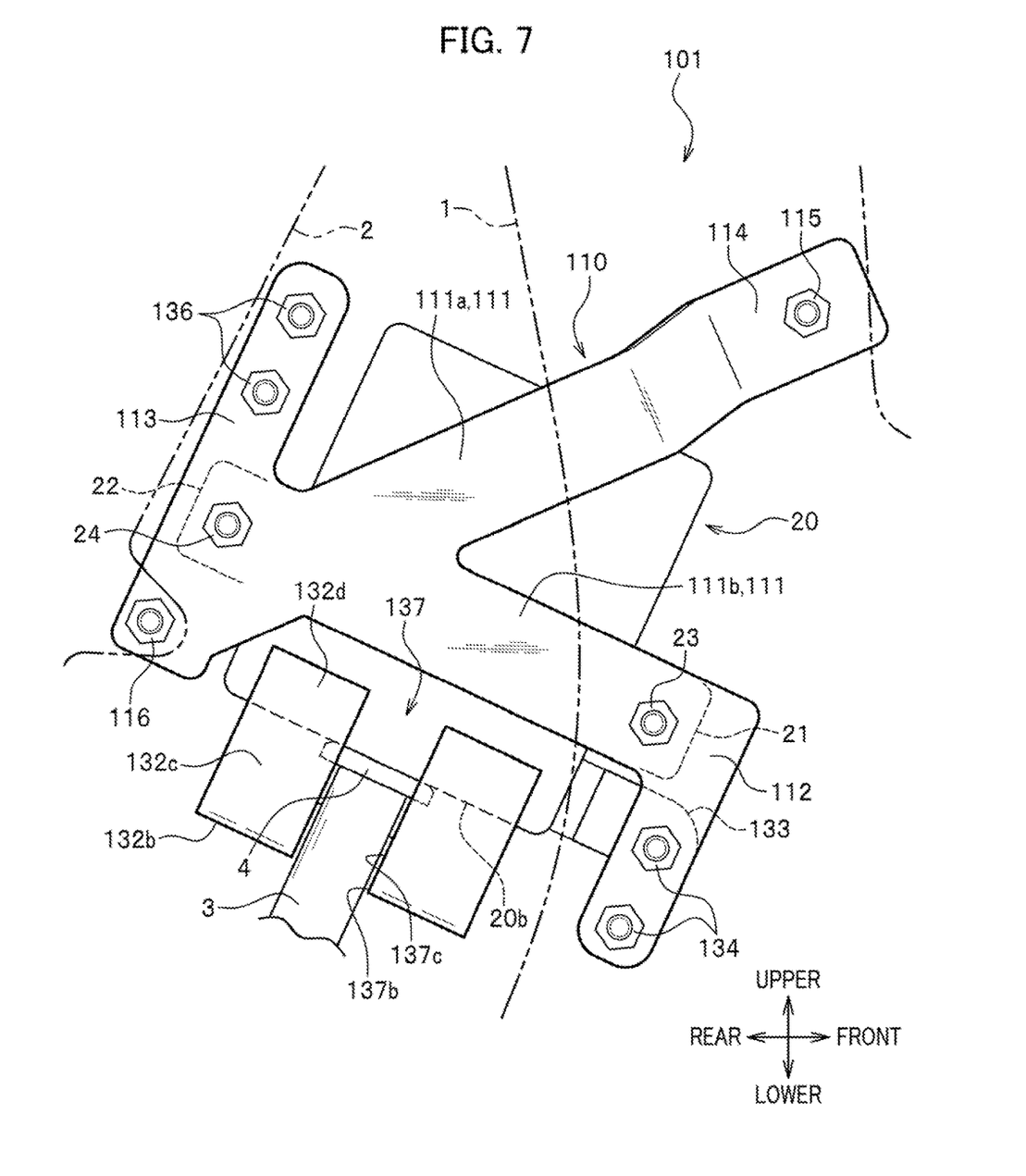
FIG. 7 is a side view of the anti-theft bracket and its vicinity in the second embodiment from outside the vehicle (from its left side)

As shown in FIG. 7, the base bracket 110 includes: a main body part 111 shaped substantially like the letter V in a side view with an upper main body 111a and a lower main body 111b of the main body part 111 becoming farther from each other in the upper-lower direction toward their front from their rear; a front flange 112 provided to a front end of the lower main body 111b; a rear flange 113 provided to a rear end of the main body part 111; and an upper flange 114 provided to the upper main body 111a.

The main body part 111 is arranged between the first frame 1 and the second frame 2.

As shown in FIG. 6, the upper flange 114 is superposed on the vehicle inner side of the first frame 1, and is fastened to the first frame 1 with abase fastener 115. A lower end part of the rear flange 113 is superposed on the vehicle inner side of the second frame 2, and the rear flange 113 is fastened to the second frame 2 with a base fastener 116.

The front flange 112 is arranged at the vehicle inner side of the first frame 1. In addition, the front flange 112 becomes farther from the first frame 1 in the vehicle width direction. This secures a space in which to arrange nuts of the respective fasteners (the first driver fastener 23 and first anti-theft fasteners 134) to be fastened to the front flange 112.

The parking driver 20 is superposed on a vehicle inner side of the main body part 111 of the base bracket 110 between the first frame 1 and the second frame 2. The first flange 21 of the parking driver 20 is superposed on a vehicle inner side of a base portion of the front flange 112, and is fastened to the front flange 112 with the first driver fastener 23. The second flange 22 is superposed on a vehicle inner side of a middle portion of the rear flange 113 in the upper-lower direction, and is fastened to the rear flange 113 with the second driver fastener 24.

The anti-theft bracket 130 is a U-shaped part arranged near the parking driver 20, and covering the lower portion of the parking driver 20. The anti-theft bracket 130 includes: an inner wall part 131 covering the vehicle inner side of the parking driver 20; and a connector detachment restricting part 132 covering a lower side of the parking driver 20.

The inner wall part 131 extends in the front-rear direction along the lower portion of the parking driver 20.

A first projecting piece 133 bent rightward (toward the vehicle outer side) is formed in a front end of the inner wall part 131. The first projecting piece 133 is superposed on a vehicle inner side of the front flange 112 of the base bracket 110. In addition, the first projecting piece 133 is fastened to the front flange 112 with two first anti-theft fasteners 134.

A second projecting piece 135 projecting upward is formed in a rear end of the inner wall part 131. The second projecting piece 135 includes: a driver detachment restricting part 135a extending in the upper-lower direction, and covering a vehicle inner side of the second driver fastener 24; an extending part 135b extending from an upper end of the driver detachment restricting part 135a toward the vehicle outer side; and a fastened part 135c extending upward from a vehicle outer side end portion of the extending part 135b.

The driver detachment restricting part 135a overlaps the head of a bolt 24a of the second driver fastener 24 in a view from an axial direction of the bolt 24a.

The extending part 135b extends in the vehicle width direction behind the parking driver 20, and is close to a rear surface of the parking driver 20.

The fastened part 135c is superposed on a vehicle inner side of an upper end portion of the rear flange 113, and is fastened to the rear flange 113 with two second anti-theft fasteners 136.

Figure 8A:
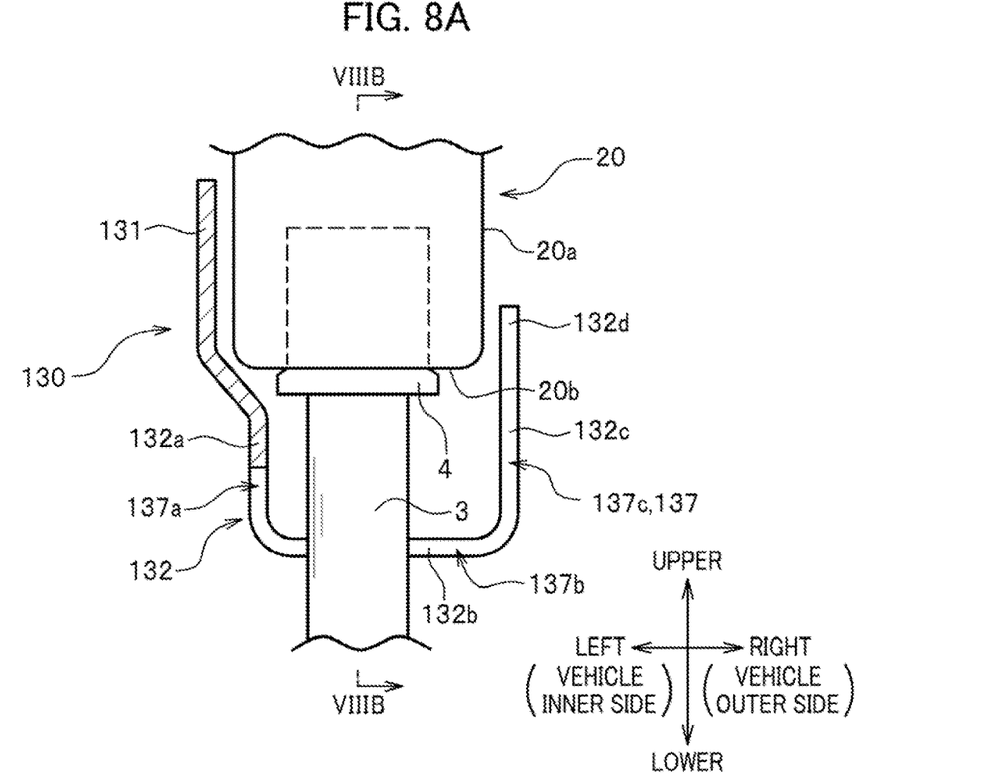
FIG. 8A is a cross-sectional view taken along the VIIIA-VIIIA line and in a direction pointed by the arrow lines VIIIA in FIG. 6.

As shown in FIG. 8A, the connector detachment restricting part 132 is shaped like the letter U which is open upward in a view from the front-rear direction, and covers the lower surface 20b of the parking driver 20 and the male connector 4 from under them. Incidentally, although the connector detachment restricting part 132 according to the second embodiment has a U shape in the view from the front-rear direction, the present invention may employ a configuration in which the connector detachment restricting part 132 has an angular U shape in the view from the front-rear direction.

The connector detachment restricting part 132 includes: a first wall part 132a extending downward from a lower end of the inner wall part 131; a second wall part 132b extending from the first wall part 132a toward the vehicle outer side; and a third wall part 132c extending upward from a vehicle outer side end portion of the second wall part 132b.

The second wall part 132b is away from (faces) the lower surface 20b of the parking driver 20 in the detachment direction A with a predetermined space in between.

An upper end 132d of the third wall part 132c extends further upward than the lower surface 20b of the parking driver 20. Furthermore, the upper end 132d of the third wall part 132c is close to the right surface 20a (the vehicle outer side surface) of the parking driver 20, and thus prevents the male connector 4 from passing between the upper end 132d and the right surface 20a.

As shown in FIG. 7, the third wall part 132c includes a cut 137 formed therein by being notched downward from the upper end 132d.

As shown in FIG. 8A, the cut 137 is formed from the upper end 132d of the third wall part 132c toward a lower end of the third wall part 132c, traverses the second wall part 132b in the vehicle width direction, and extends up to a lower end of the first wall part 132a. Thus, the cut 137 includes: a first cut 137a formed in the first wall part 132a; a second cut 137b formed in the second wall part 132b; and a third cut 137c formed in the third wall part 132c.

The second cut 137b is formed at a position facing the female connector 20c of the parking driver 20, and the harness 3 is routed to pass through the inside of the second cut 137b.

The first cut 137a prevents part of the harness 3 arranged inside the second cut 137b from contacting the lower end of the first wall part 132a.

The third cut 137c allows part of the harness 3 arranged outside of the cut 137 to move into the second cut 137b.

Figure 8B:
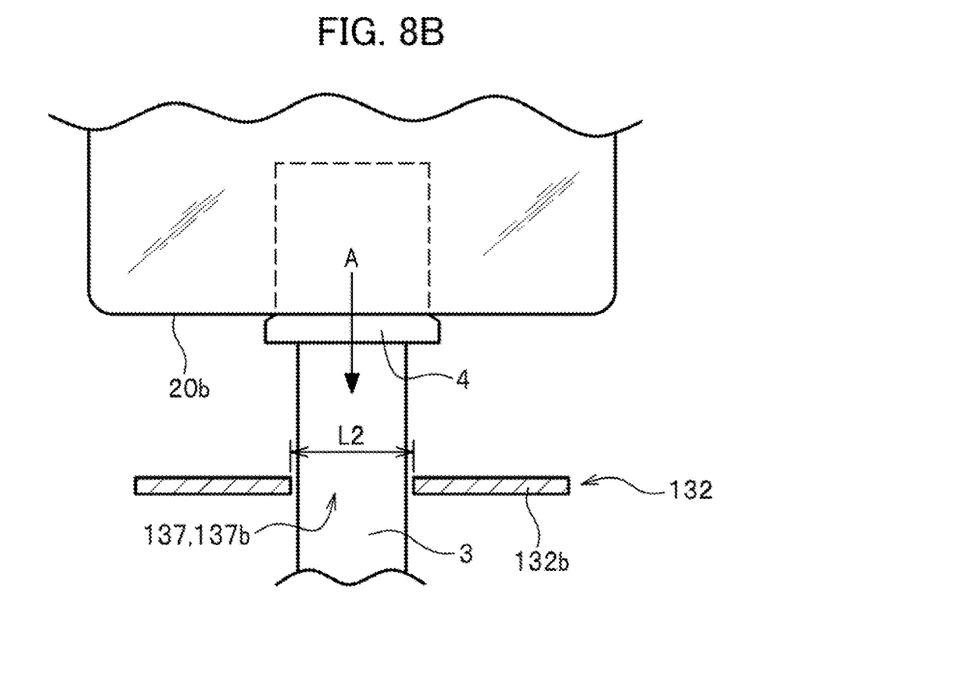
FIG. 8B is an end view taken along the VIIIB-VIIIB line and in a direction pointed by the arrow lines VIIIB in FIG. 8A.

As shown in FIG. 8B, the cut 137 (the first, second and third cuts 137a, 137b, 137c) is formed such that its width L2 in the front-rear direction is substantially equal to the diameter of the harness 3. Thus, the male connector 4 whose cross-sectional shape taken in the length direction of the harness 3 is greater than that of the harness 3 cannot pass through the inside of the cut 137. Incidentally, FIG. 8B illustrates the width L2 in a larger scale for the purpose of facilitating the understanding.

As discussed above, the vehicle 101 according to the second embodiment includes the anti-theft bracket 130, which makes it difficult to insert a tool and the hand toward the male connector 4. Even if a tool and the like are inserted and the male connector 4 is detached from the parking driver 20, the male connector 4 is locked by an edge portion of the cut 137. In addition, even if anyone tries to locate the harness 3 outside the cut 137 by moving the harness 3 inside the third cut 137c, the male connector 4 is locked by a lower surface 20b of the parking driver 20. This holds the male connector 4 locked by the edge portion of the cut 137, and thus makes it difficult to detach only the male connector 4 from the parking driver 20.

On the other hand, it takes much time to detach the anti-theft bracket 130 and unlock the male connector 4 from the edge portion of the cut 137. From the above reasons, the anti-theft bracket 130 offers a very high capability of protecting the vehicle 101 from theft.

Furthermore, one may consider the detaching of the parking driver 20 instead of the anti-theft bracket 130 as a method of unlocking the male connector 4 from the edge portion of the cut 137. The driver detachment restricting part 135a, however, overlaps the head (the first driver fastener 23) of the bolt 24a in the view from the axial direction. Thus, even if anyone tries to fit a socket over the head of the bolt 24a from the vehicle inner side, the foregoing configuration forces the socket to come into contact with the driver detachment restricting part 135a and does not allow the socket to be fitted over the head of the bolt 24a. For this reason, the parking driver 20 can be detached only after the anti-theft bracket 130 is detached. The above-mentioned method, therefore, cannot detach the male connector 4.

Moreover, the extending part 135b of the anti-theft bracket 130 is arranged behind the parking driver 20, while the upper flange 114 of the base bracket 110 is arranged above the parking driver 20 (see FIG. 6). Thus, even if only the first driver fastener 23 is detached, the parking driver 20 cannot move rearward (turn) around the bolt 24a serving as the turn axis. In other words, even if the harness 3 is moved upward along the third cut 137c, the male connector 4 is unlikely to be detached since the male connector 4 is locked by the lower surface 20b of the parking driver 20.

It should be noted that the present invention may form the upper flange (the flange part) 114 for restricting the turn of the parking driver 20 around the bolt 24a in the anti-theft bracket 130 instead of in the base bracket 110.

Third Embodiment

Figure 9:
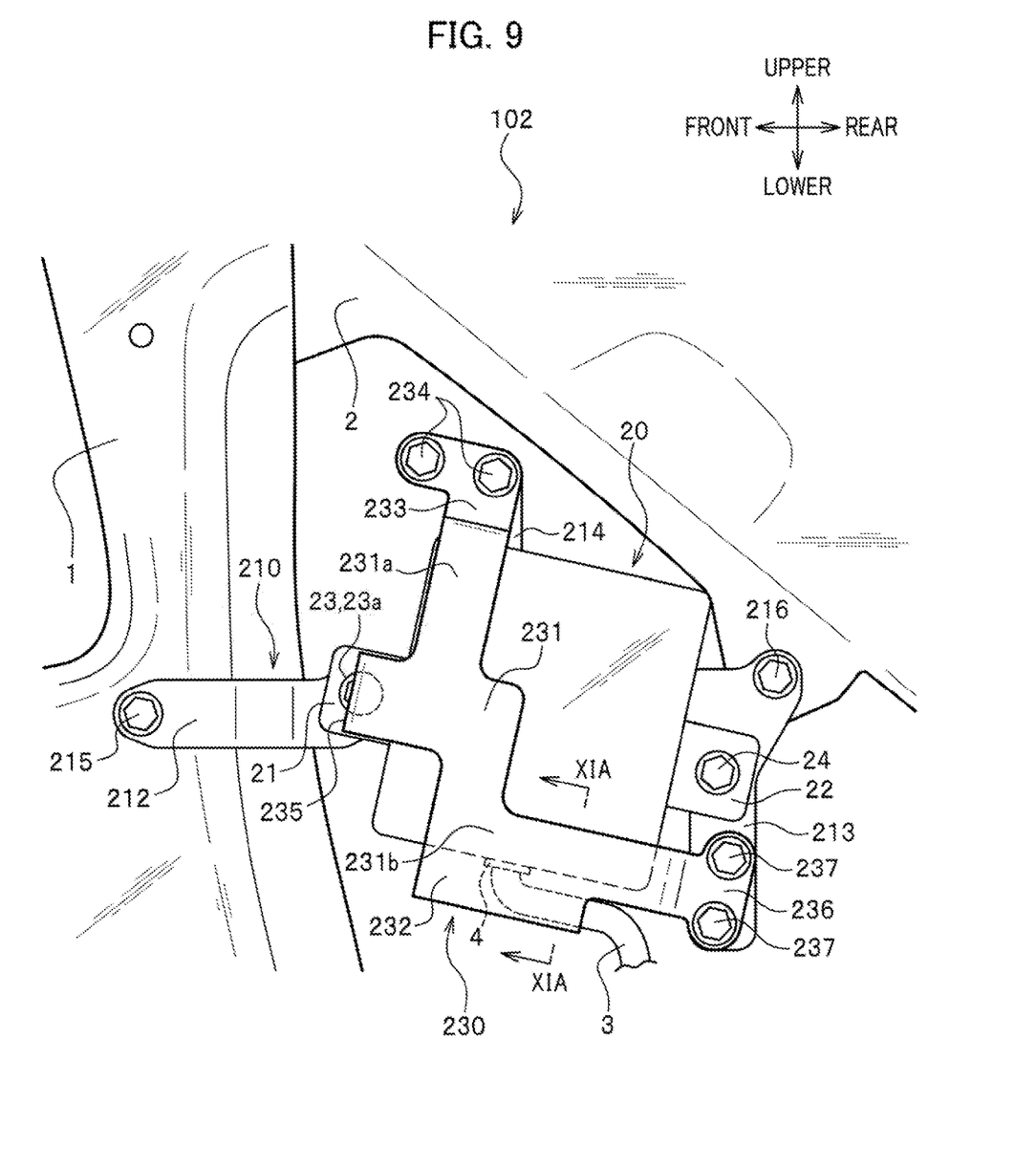
FIG. 9 is a side view of an anti-theft bracket and its vicinity in a third embodiment from inside the vehicle (from its left side)

As shown in FIG. 9, a vehicle 102 includes: the first frame extending in the upper-lower direction; the second frame 2 extending rearward and downward from the first frame 1; the harness 3; a base bracket 210 extending over between the first frame 1 and the second frame 2; the parking driver 20 fixed to a vehicle inner side of the base bracket 210; and an anti-theft bracket 230 covering the lower portion of the parking driver 20.

What makes the vehicle 102 according to the third embodiment different from the vehicle 100 according to the first embodiment is that the vehicle 102 includes the base bracket 210 instead of the base bracket 10, and the anti-theft bracket 230 instead of the anti-theft bracket 30. Only differences from the first embodiment will be hereinafter described.

Figure 10:
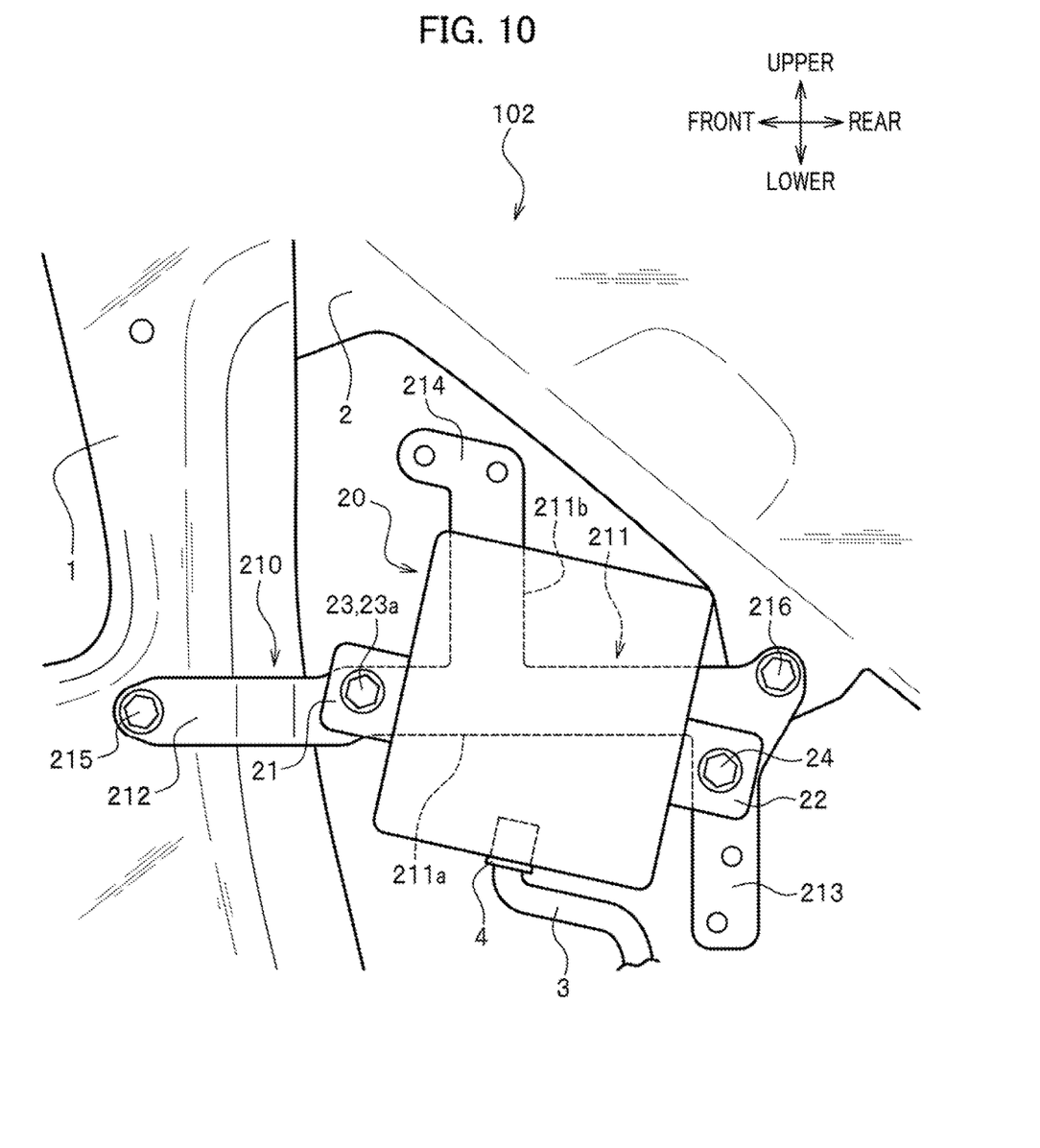
FIG. 10 is a side view of the condition shown in FIG. 9 with the anti-theft bracket detached therefrom from inside the vehicle (from its left side)

As shown in FIG. 10, the base bracket 210 includes: a main body part 211 shaped substantially like the letter T in a side view (a first main body 211a extending in the front-rear direction, and a second main body 211b extending upward from the first main body 211a); a front flange 212 provided to a front end of the first main body 211a; a rear flange 213 provided to a rear end of the first main body 211a; and an upper flange 214 provided to an upper end of the second main body 211b.

The main body part 211 is arranged between the first frame 1 and the second frame 2. The front flange 212 is superposed on the vehicle inner side of the first frame 1, and is fastened to the first frame 1 with a base fastener 215. A base portion of the rear flange 213 is superposed on the vehicle inner side of the second frame 2, and the rear flange 213 is fastened to the second frame 2 with a base fastener 216.

The parking driver 20 is superposed on a vehicle inner side of the main body part 211 of the base bracket 210 between the first frame 1 and the second frame 2. The first flange 21 of the parking driver 20 is superposed on a vehicle inner side of a base portion of the front flange 212, and is fastened to the front flange 212 with the first driver fastener 23. The second flange 22 of the parking driver 20 is superposed on a vehicle inner side of a middle part of the rear flange 213 in the upper-lower direction, and is fastened to the rear flange 213 with the second driver fastener 24.

As shown in FIG. 9, the anti-theft bracket 230 includes: an inner wall part 231 covering part of the vehicle inner side of the parking driver 20; and a connector detachment restricting part 232 covering the lower side of the parking driver 20.

The inner wall part 231 includes: a first inner wall part 231a shaped substantially like the letter L in a side view, and extending in the upper-lower direction along a front portion of the parking driver 20; and a second inner wall part 231b extending rearward from a lower end of the first inner wall part 231a while winding.

A first projecting piece 233 extending toward the vehicle outer side is formed in an upper end of the first inner wall part 231a. A distal end of the first projecting piece 233 is superposed on a vehicle inner side of the upper flange 214 of the base bracket 210, and the first projecting piece 233 is fastened to the upper flange 214 with two first anti-theft fasteners 234.

A driver detachment restricting part 235 extending toward the vehicle outer side is formed in a front end of a lower portion of the first inner wall part 231a. The driver detachment restricting part 235 overlaps the head of the bolt 23a of the first driver fastener 23 in a view from the axial direction of the bolt 23a.

A second projecting piece 236 extending toward the vehicle outer side is formed in a rear end of the second inner wall part 231b. The second projecting piece 236 is superposed on a vehicle inner side of the rear flange 213 of the base bracket 210, and is fastened to the rear flange 213 with two second anti-theft fasteners 237.

Figure 11A:
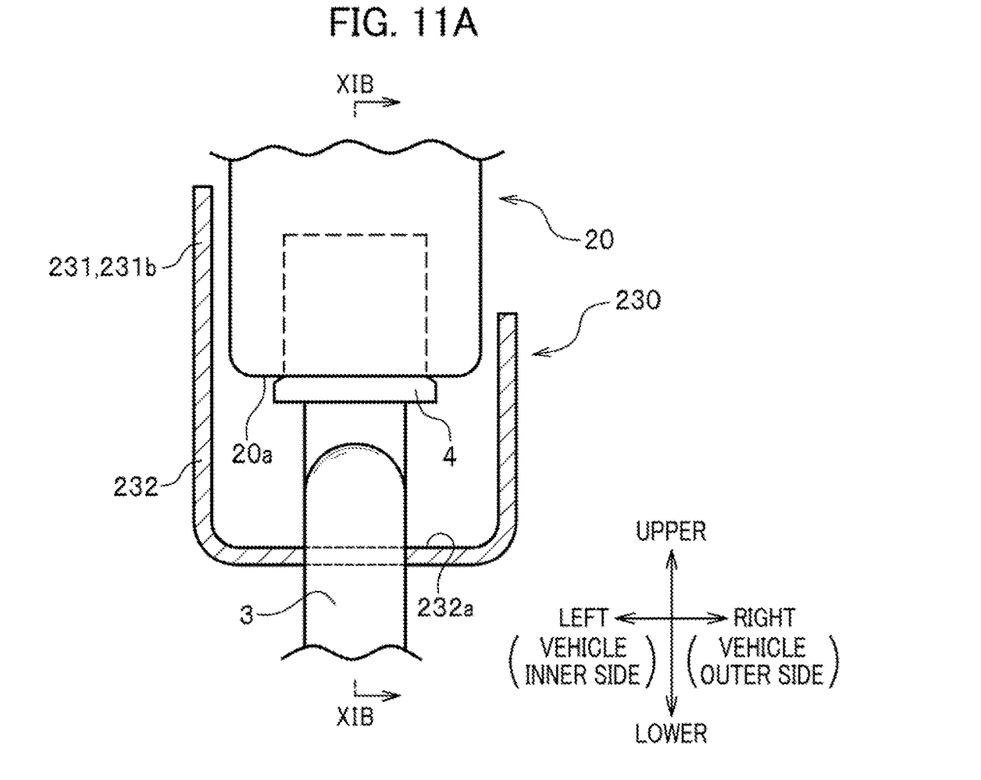
FIG. 11A is a cross-sectional view taken along the XIA-XIA line and in a direction pointed by the arrow lines XIA in FIG. 9.

As shown in FIG. 11A, the connector detachment restricting part 232 is shaped like the letter U which is open upward in a view from the front-rear direction, and covers the lower surface 20b of the parking driver 20 and the male connector 4 from under them. Incidentally, although the connector detachment restricting part 232 according to the third embodiment has a U shape in the view from the front-rear direction, the present invention may employ a configuration in which the connector detachment restricting part 232 has an angular U shape in the view from the front-rear direction.

Figure 11B:
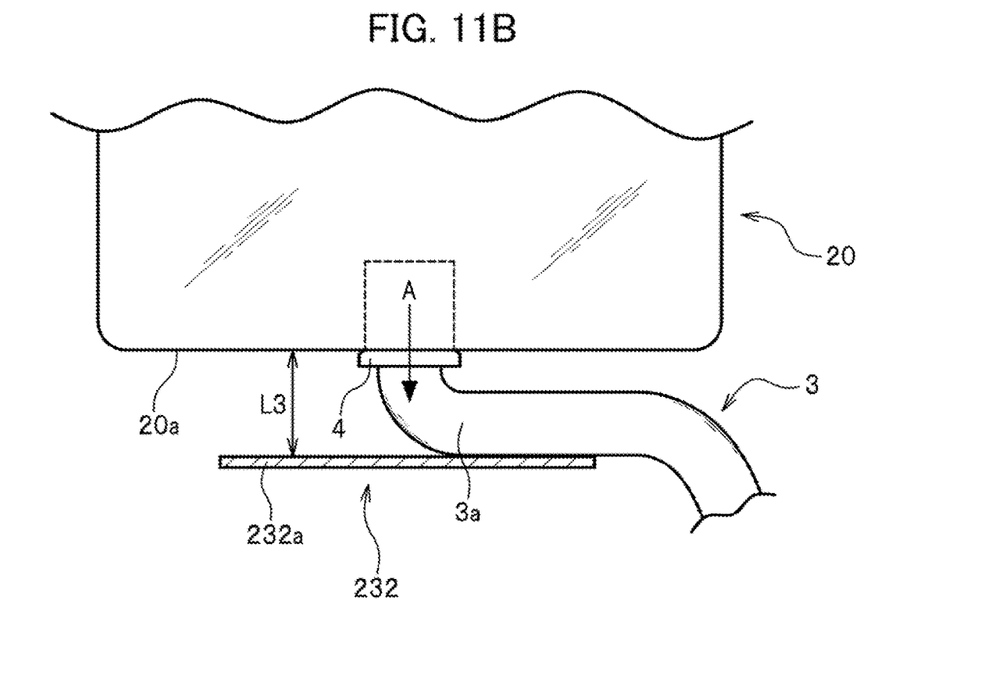
FIG. 11B is an end view taken along the XIB-XIB line and in a direction pointed by the arrow lines XIB in FIG. 11A.

As shown in FIG. 11B, a bottom wall part 232a of the connector detachment restricting part 232 is formed in parallel with the lower surface 20b of the parking driver 20. In addition, a distance L3 between the bottom wall part 232a and the lower surface 20b of the parking driver 20 is formed relatively shorter. Thus, the bottom wall part 232a closes the side in the detachment direction A of the male connector 4, and the one end part 3a of the harness 3 continuing to the male connector 4 is bent and contacts the bottom wall part 232a.

As discussed above, the vehicle 102 according to the third embodiment includes the anti-theft bracket 230, which makes it difficult to insert a tool and the hand toward the male connector 4. In addition, since the bottom wall part 232a of the connector detachment restricting part 232 contacts the one end part 3a of the harness 3 and thus restricts the detachment of the male connector 4, the detachment of the male connector 4 is also difficult to perform. On the other hand, it takes much time to detach the anti-theft bracket 230 and cancel the restriction performed by the connector detachment restricting part 232. From the above reasons, the anti-theft bracket 230 offers a very high capability of protecting the vehicle 102 from theft.

Furthermore, one may consider the detaching of the parking driver 20 instead of the anti-theft bracket 230 as a method of bringing the harness 3 out of contact with the bottom wall part 232a. In the third embodiment, however, the driver detachment restricting part 235a overlaps the head (the fastener) of the bolt 23a in the view from the axial direction. Thus, even if anyone tries to fit a socket over the head of the bolt 23a from the vehicle inner side, the socket comes into contact with the driver detachment restricting part 235a, and cannot be fitted over the head of the bolt 23a. For this reason, the parking driver 20 can be detached only after the anti-theft bracket 230 is detached. The above-mentioned method, therefore, cannot detach the male connector 4.

Moreover, the first projecting piece (flange part) 233 of the anti-theft bracket 230 is arranged above the parking driver 20 (see FIG. 9). Thus, even if only the second driver fastener 24 is detached, the parking driver 20 cannot move upward (turn) around the bolt 23a serving as the turn axis. Accordingly, the contact of the harness 3 with the bottom wall part 232a can be cancelled, and the male connector 4 is unlikely to be detached.

The foregoing descriptions have been provided for the embodiments, but the present invention is not limited to the embodiments.

For example, the number of fasteners with which to fix each anti-theft bracket to the mating base bracket is not limited to what has been shown in the corresponding embodiment. Furthermore, a larger number of fasteners is desirable since the larger number increases the amount of time it takes to detach the anti-theft bracket.

In addition, although each embodiment is configured such that the anti-theft bracket includes the single driver detachment restricting part, a configuration may be employed in which the anti-theft bracket includes multiple driver detachment restricting parts corresponding to the multiple fasteners (the first driver fastener 23 and the second driver fastener 24).

Moreover, in a case where the parking driver 20 is not fixed with the fasteners (the first driver fastener 23 and the second driver fastener 24), the anti-theft bracket does not have to include the driver detachment restricting part.

What is claimed is:

1. An anti-theft bracket provided near a parking driver, wherein
the parking driver is connected to a parking actuator via a harness with a connector of the harness inserted in the parking driver,
the anti-theft bracket includes a connector detachment restricting part covering the connector, and
the anti-theft bracket further comprises a flange part adjacent to the parking driver, wherein the flange part is arranged on a side opposite to the connector detachment restricting part with the parking driver interposed in between.

2. An anti-theft bracket provided near a parking driver, wherein
the parking driver is connected to a parking actuator via a harness with a connector of the harness inserted in the parking driver,
the anti-theft bracket includes a connector detachment restricting part covering the connector,
the parking driver is fixed to a vehicle body with a fastener, and
the anti-theft bracket includes a driver detachment restricting part covering at least part of the fastener in a view from an axial direction of the fastener.

3. An anti-theft bracket provided near a parking driver, wherein
the parking driver is connected to a parking actuator via a harness with a connector of the harness inserted in the parking driver,
the anti-theft bracket includes a connector detachment restricting part covering the connector,
the harness is routed to extend along the connector detachment restricting part, and
a bent part bent along a routing path of the harness is formed in an end portion of the connector detachment restricting part.

4. The anti-theft bracket according to claim 1, wherein the connector detachment restricting part includes a bottom wall part which closes a side in a detachment direction of the connector.

5. The anti-theft bracket according to claim 4, wherein the connector detachment restricting part has a U shape.

6. The anti-theft bracket according to claim 2, wherein the connector detachment restricting part includes a bottom wall part which closes a side in a detachment direction of the connector.

7. The anti-theft bracket according to claim 6, wherein the connector detachment restricting part has a U shape.

8. The anti-theft bracket according to claim 3, wherein the connector detachment restricting part includes a bottom wall part which closes a side in a detachment direction of the connector.

9. The anti-theft bracket according to claim 8, wherein the connector detachment restricting part has a U shape.

* * * * *